(No Model.)
F. B. MALLORY.
SHUTTER WORKER.
No. 360,031. Patented Mar. 29, 1887.
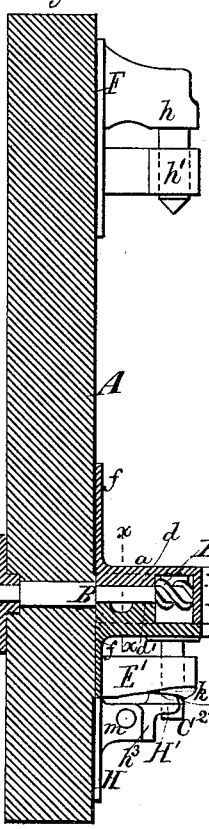
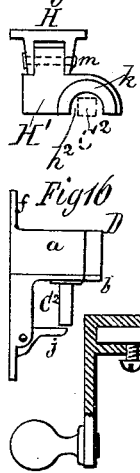
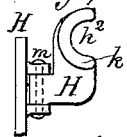
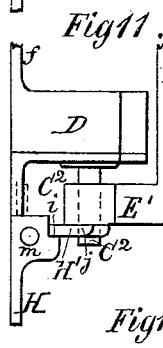
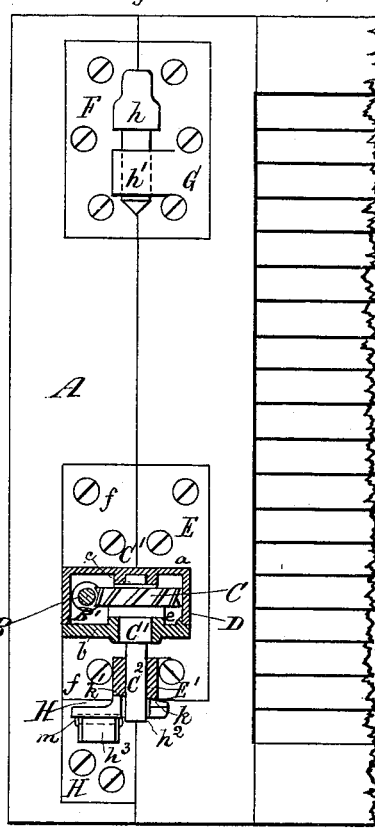
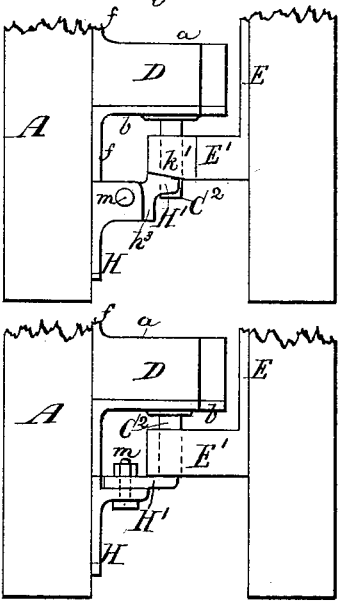
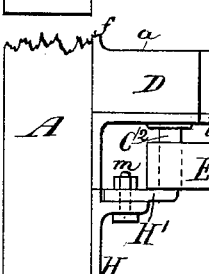
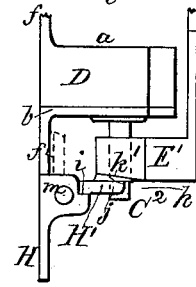
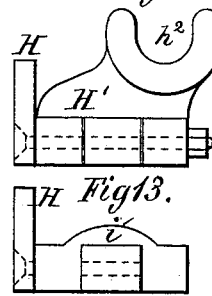
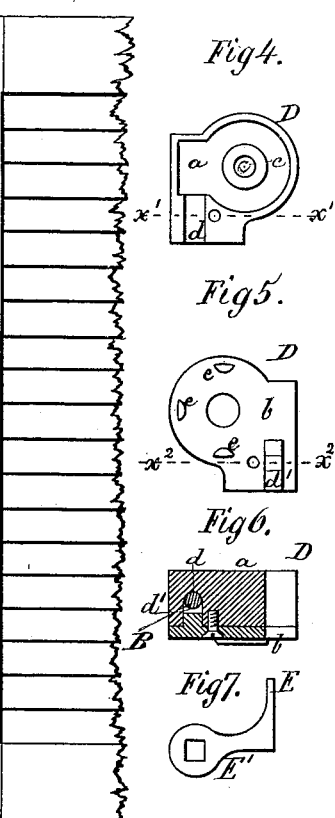
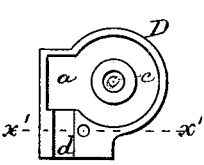
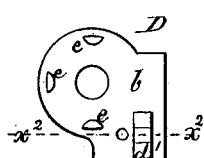
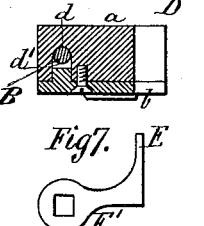
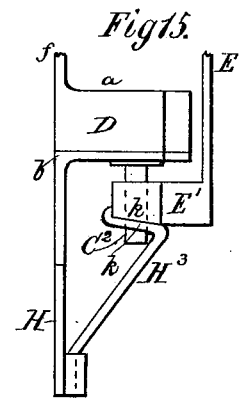
Witnesses:
J. P. Theo Lang.
R. L. Fenwick.
Inventor:
Frank B. Mallory
by his Att'y

UNITED STATES PATENT OFFICE.

FRANK B. MALLORY, OF FLEMINGTON, NEW JERSEY.

SHUTTER-WORKER.

SPECIFICATION forming part of Letters Patent No. 360,031, dated March 29, 1887.

Application filed December 15, 1886. Serial No. 221,666. (No model.)

*To all whom it may concern:*

Be it known that I, FRANK B. MALLORY, a citizen of the United States, residing at Flemington, in the county of Hunterdon and State of New Jersey, have invented certain new and useful Improvements in Means for Hanging and Working Hinged Shutters; and I do hereby declare the following to be a full, clear, and exact description of the invention, such as will enable others skilled in the art to which it appertains to make and use the same.

My invention consists in certain constructions and combinations of parts, as hereinafter described and specifically claimed, whereby a conveniently-removable or a self-adjusting support for an underhung shutter is afforded. The thread and teeth of the worm and worm-wheel of shutter-workers are held, when the shutter is open, so that they remain always in gearing contact, and are restrained by the gravity of the shutter and inclined bearing-surfaces of the fastening-brackets against moving apart, so as to cause a loose motion; and the lower pintle of the worm-wheel can be made straight, suspended by the box or housing of the gearing, and passed down through the eye of the hinge-leaf attached to the shutter, while its upper end has a seat or bearing on the under side of an imperforated water-tight cap or top plate of the said box or housing.

In the accompanying drawings, Figure 1 is a vertical section through a window-frame in the line of the shaft of a shutter-worker, the shutter connected to the shutter-worker being closed. Fig. 2 is a vertical section of the housing and the supporting-bracket in the line of the shaft of the worm-wheel, the shutter being closed, and it and the window-frame being seen in elevation from the outside. Fig. 3 is an edge view from the outside of the window-frame, showing the window-frame and my invention in elevation, the shutter being open and an edge elevation thereof shown. Fig. 4 is an inverted plan of the upper portion of the housing, and Fig. 5 is a top view of the lower plate of said housing. Fig. 6 is a detail section of the housing in the line $x\,x$ of Fig. 1, line $x'\,x'$ of Fig. 4, and line $x^2\,x^2$ of Fig. 5. Fig. 7 is a detail top view showing the lower hinge of the shutter. Fig. 8 is a top view of the shutter-support, and Figs. 9, 10, 11, 12, 13, 14, and 15 are modifications of the construction shown in Fig. 8; and Fig. 16 is a view of another modification, showing the auxiliary supporting-bracket cast integral with the bottom plate of the hinge-bracket housing.

A in the drawings designates the frame of a window, B the shaft, and B' the worm for operating a worm-wheel, C, of a shutter-worker.

D is a hinge-bracket housing for the worm and worm-wheel. This housing is formed of a main upper box-like portion, $a$, and a bottom plate, $b$. The part $a$ has a bearing-seat, $c$, formed on its under side for the upper end of the shaft C' of the worm-wheel, as shown in Fig. 2, while the parts $a$ and $b$ are constructed, respectively, as shown at $d\,d'$, with a half-bearing seat, so as to form a full bearing for the worm-shaft B. Through the inner wall of the housing a round aperture for the worm-shaft B is provided, and through the bottom plate a similar aperture for shaft C' is made. On the bottom plate, $b$, lugs $e$ are formed, which bear against the inner periphery of the box-like portion $a$. The two parts of the housing are united by a screw, which enters fastening-holes provided in the castings for that purpose, and are fastened to the outside of the window-frame by suitable screws passed through the leaves or wings $f$ of the hinge-bracket housing, as shown in Figs. 1 and 2.

The housing thus made is capable of shielding the shutter-worker gearing from water, as it is closed entirely at top, and it, with the hinge-bracket E E', attached to the shutter, and the square-shaped downward pintle-extension $C^2$ of the worm-wheel shaft, serves to make the lower hinge of the shutter. The upper hinge is formed of two parts or leaves, F and G, having brackets $h\,h'$, the upper one formed with a pintle and the lower one with an eye for the pintle to pass through.

The construction thus far described necessitates the applying of the hinge-leaves attached to the shutter to the pintles of the portions attached to the window-frame by an upward movement from below the pintles, and therefore a contrivance which will admit of this underhanging of the shutters, and will also support the shutters and keep them from descending so as to get off the pintles, is necessary, and I will now describe this contrivance and other features of my invention.

H is an auxiliary bracket-plate fastened to the frame of the window or to the building, and H' is a bracket portion connected to said plate by means of a pin, $m$, which may serve as a pivot on which the portion H' can turn, or as a simple pin for rigidly connecting the portion H' to the plate H. The bracket portion H' may be of the form shown in Figs. 8, 9, and 12, being formed with a semicircular recess, $h^2$, for the pintle-extension $C^2$ of the worm-wheel shaft to pass through, as illustrated in several of the figures. If the portion H' is rigidly fastened to the bracket-plate by a pin, $m$, as illustrated in Fig. 14, the semicircular recess $h^2$ may be omitted, and the pin will be withdrawn and the plate taken off, so as to allow the eye-bracket of the hinge-leaf attached to the shutter to be passed up over the pintle-extension $C^2$ of the worm-wheel shaft, and then replaced and secured by the pin $m$.

If the pin $m$ is used as a pivot, the semicircular recess $h^2$ is desirable, and the necessity of taking out the pin is avoided, for by pressing the eye-bracket of the hinge-leaf attached to the shutter upward against the portion H' of the auxiliary supporting-bracket the said portion will rise out of the way, as illustrated by dotted lines in Figs. 10 and 11, and as soon as the shutter is hung said bracket portion H' will be caused by its gravity or the weight of the shutter upon it to descend to its normal position and lie under the hinge-bracket of the hinge-leaf attached to the shutter and firmly support it, as well as prevent its passing off the pintle.

For staying the bracket portion H' a knee-projection, $h^3$, may be formed upon it, as shown in Figs. 1, 2, and 3, or shoulders $i$ may be formed on the plate H, and side flanges, $j$, formed on the bracket portion H', as shown in Figs. 10 and 11.

In Figs. 12 and 13 I have shown the bracket-plate H formed with a right-angular projecting portion or shoulder, $i'$, having a single eye for a hinge-pin, $m$, and the bracket portion H' formed with two eyes for the pin $m$, between which the eye of the bracket-plate fits, and the whole connected by the pin $m$. The semicircular recess $h^2$ in the bracket portion H' of all the constructions provided with it admits of the side extensions of said bracket portion being brought in range with the eyed portion of the hinge-leaf attached to the shutter without setting the pintle-extension of the worm-wheel shaft an objectionable distance out from the window-frame, while it insures the moving back of said bracket portion and said eyed portion during the act of moving the shutter up on the pendent hinge-pintles, and the falling back of the same under said eyed portion after the shutter is passed up a proper distance beyond it.

I regard the plan of construction shown in Figs. 12 and 13 as preferable to the others described and shown.

The supporting-brackets and the hinges of the shutters described may be constructed after the style shown, or after the style known as "parliament" shutter-hinges. The top surface of the bracket portion H' may be horizontal and support the shutter; but I have devised, as shown in some of the figures, an inclined surface, $k$, for the said bracket portion H', and a reversely-inclined surface, $k'$, for the under side of the bracket of the leaf of the hinge attached to the shutter, and by this construction the tendency of the shutter to play on its hinge-pintles after it has been fully opened will be restrained by the incline and the gravity of the shutter, and this being the case, the rattling of the gearing of the shutter-worker will be overcome, for the thread of the worm-shaft and the teeth of the worm-wheel will not be permitted to move apart by the slight vibrations which would be experienced with the shutters swinging on a horizontal surface instead of against an inclined surface such as herein described.

In Fig. 15 a yielding support, $H^3$, in form of an angular spring, is shown attached by one end to the frame of the window, its other end being free and extending in close proximity to the hinge-pintle extension of the worm-wheel shaft. With this construction it is necessary for the bracket of the hinge-leaf attached to the shutter to be pressed laterally against the spring-support, so as to move it toward the window-frame far enough to permit the passage of the hinge-pintle into the hinge-bracket eye, whereupon the spring will resume its normal position and stand under the hinge-bracket of the shutter, as illustrated in Fig. 15, and thereby support it.

In Fig. 16 I have shown the bracket-supporting portion H' pinned or pivoted to an extension bracket-plate, $H^3$, cast integral with the hinge-bracket housing, and I desire to include this construction in my patent as an equivalent of my auxiliary supporting-bracket H H'.

What I claim as my invention is—

1. The combination, with shutter-hinges having pendent pintles on which the shutters are underhung, of a bracket shutter-supporting portion applied to the building, or an attachment thereof, thereby supporting the lower hinge and the shutter to which it is fastened, substantially as and for the purpose described.

2. The combination, with the upper and lower pendent pintles of shutter-hinges, of the auxiliary supporting-bracket formed of two parts, one of which is adapted for being moved out of the way by the action of the shutter-hinge upon it when the shutter is moved upward on the pintles and falling beneath the eyed bracket of the hinge-leaf when the said bracket has risen to the proper distance on the pintles, substantially as described.

3. The combination, with the upper and lower pendent pintles of shutter-hinges, of the auxiliary bracket formed of two parts pivoted together and provided with staying-projection and formed with a recess, substantially as and for the purpose described.

4. The combination of the housing, the worm, worm-shaft, worm-wheel, vertical pendent worm-wheel shaft having a pintle-extension formed on it, upper bearing on the under side of the top plate of the housing, the hinge-leaves attached to the shutter, upper pendent pintle, and an auxiliary supporting-bracket, which is adapted to be moved out of the way and capable of readjusting itself, substantially as and for the purpose described.

5. The auxiliary bracket formed with an inclined surface, $k$, and the hinge-leaf attached to the shutter, also formed with an inclined surface, $k'$, in combination with a bracket-housing, worm-shaft, worm, worm-wheel shaft, and worm-wheel, substantially as and for the purpose described.

6. The combination of the hinge-bracket housing formed of two parts, the upper one closed at top, and with lugs, half-bearings, and fastening-hole for receiving the screw or equivalent fastening which holds the parts together, with the worm and its shaft, worm-wheel and its shaft, and the hinge-leaf attached to the shutter, substantially as and for the purpose described.

In testimony whereof I affix my signature in presence of two witnesses.

FRANK B. MALLORY.

Witnesses:
N. DUNHAM STIGER,
C. C. DUNHAM.